Aug. 15, 1950 — C. A. LANGSTAFF — 2,518,625
FLOW BEAN

Filed May 11, 1946 — 3 Sheets-Sheet 1

INVENTOR.
CLINTON A. LANGSTAFF
BY Mason & Graham
ATTORNEYS

Aug. 15, 1950 — C. A. LANGSTAFF — 2,518,625
FLOW BEAN

Filed May 11, 1946 — 3 Sheets-Sheet 2

INVENTOR.
CLINTON A. LANGSTAFF
BY Mason Graham
ATTORNEYS

Aug. 15, 1950

C. A. LANGSTAFF 2,518,625

FLOW BEAN

Filed May 11, 1946

INVENTOR.
CLINTON A. LANGSTAFF
BY Mason & Graham
ATTORNEYS

Patented Aug. 15, 1950

2,518,625

UNITED STATES PATENT OFFICE 2,518,625

FLOW BEAN

Clinton A. Langstaff, Compton, Calif.

Application May 11, 1946, Serial No. 669,020

1 Claim. (Cl. 137—153)

My present invention has to do with devices for and methods of controlling the flow of oil wells, such devices being commonly known in the art as "flow beans."

In oil wells flowing under the influence of natural gas pressure in the well, there are many characteristics to be met in controlling the flow. An ideal well is one which does not flow sand and water along with the oil and which has a low proportion of gas to oil and the gas is evenly entrained in the oil. With proper beaning and proper adjustment of the tubing such a well flows in an even, smooth stream, without heading, and without dissipating too much gas in proportion to the oil flow. There are also wells which flow both sand and water along with the oil and gas and the flow is subject to heading and possesses highly abrasive characteristics. The heading is wasteful of gas and causes uneven flow, the well flowing a slug of oil one moment and free gas the next, with the result that the flow pressure builds up when the oil is flowing and falls when the gas is passing. The aim is to maintain the proper back pressure on the well and to streamline the flow passage so as to minimize turbulence, since turbulence tends to emulsify the oil and water, rendering separation more difficult and expensive, wear or cutting of the passageway causing turbulence. Therefore, the ideal flow bean is one which is subject to minimum wear by abrasives in the flow and in which such wear as does occur may be quickly compensated for without disturbing the streamlining of the flow.

Flow beans of various types have been proposed for correcting these irregularities of flow by reducing the size of the flow orifices when the flow consists largely of gas and to enlarge the orifice when the flow consists primarily of oil. However, such flow beans as are known have rather serious shortcomings. They are subject to rapid wear and it is difficult or impossible to properly reset or refinish the valve to compensate for wear without disturbing the desired streamlined flow conditions. Moreover, they are incapable of effecting a change in the orifice as quickly as is desirable to maintain an even flow. They are also difficult to calibrate particularly where conditions of wear are present and changes cannot be made without interrupting the desired even flow conditions.

It is therefore an object of my invention to provide a flow bean which has a relatively long life even when subjected to the highly abrasive action of flow containing sand.

Another object is to provide a flow bean in which compensation for wear may be effected rapidly without impairing the efficiency of operation.

Another object is the provision of a device of this character in which a complete closure of the valve can be made for calibration purposes even after wear has taken place.

An additional object of the invention is to provide a flow bean device in which the size of the orifice is automatically changed in consonance with the flow pressure of the well even under conditions tending to cause heading.

A further object is to provide a flow control device in which the orifice opening may be changed without impairing even flow conditions.

Another object is to provide a novel method of controlling the flow of an oil well.

My invention possesses still further objects and corresponding advantages which will become obvious from the following description of presently preferred embodiments thereof, for which purpose I shall refer to the accompanying drawings, in which.

I wish it understood, however, that in its broader aspects as defined by the accompanying claim, my invention is susceptible of various modifications and adaptations which the ensuing description will suggest to those familiar with this art.

Figure 1:
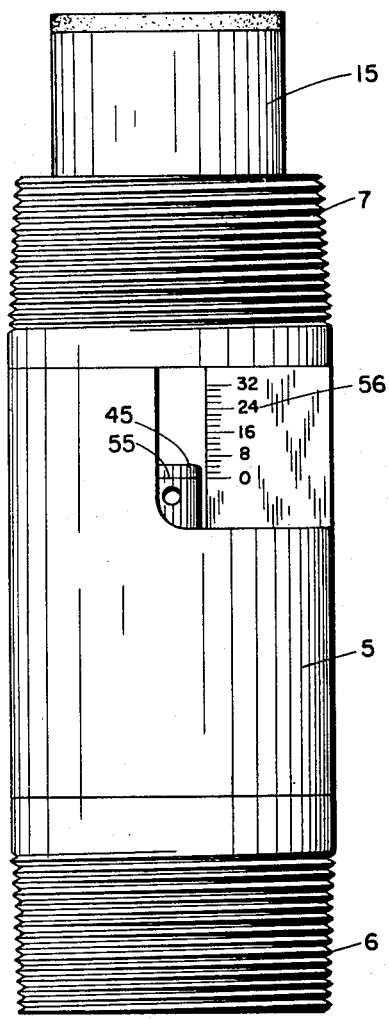
Fig. 1 is a side elevation of one embodiment of my invention.
Figure 2:
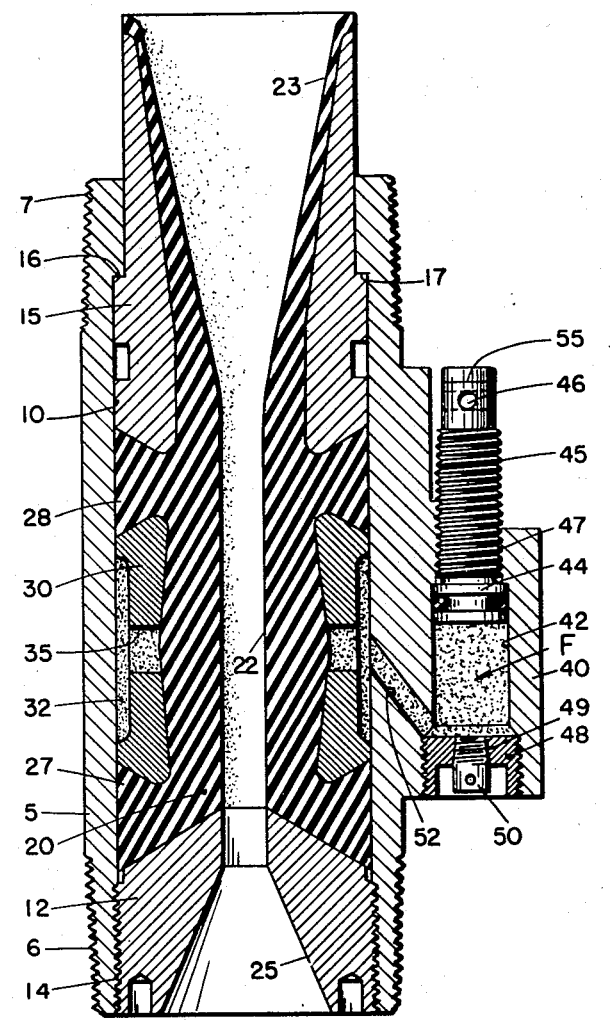
Fig. 2 is a medial longitudinal section of Fig. 1.
Figure 3:
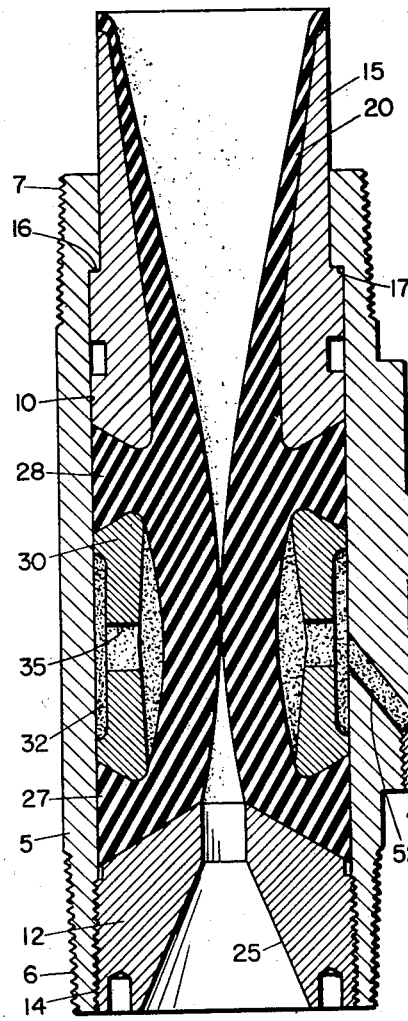
Fig. 3 is a view like Fig. 2 but showing the throat of the device completely closed.

In Figs. 1, 2 and 3 I show an adaptation of my invention which is primarily suited to wells flowing with low gas pressure and without heading—that is, wherein the purpose of the flow bean is simply to regulate a relatively even natural flow.

With the reference to those figures, the numeral 5 denotes a tubular casing exteriorly threaded at its inlet end, as shown at 6 for connection to an outlet from the well. In practice the inlet end of the casing is screwed onto an outlet pipe from the conventional "Christmas tree" not shown, which latter is the name commonly applied in the oil producing industry to the pipe fitting and flow line assembly at the top of an oil well. The upper end of the casing is exteriorly threaded at 7 for connection to an outlet pipe.

Confined in the bore 10 in the casing by plugs 12, 15, there is a soft rubber or neoprene sleeve 20. Plug 12 is exteriorly threaded at 14, which threads mesh with internal threads in the inlet end of the casing, and plug 15 has an annular upwardly facing shoulder 16 which abuts an annular shoulder 17 in the upper end of the casing. Thus the parts may be installed in and removed from the casing by removing the plug 12.

The sleeve 20, in its normal cross section, has an axial opening which is substantially uniform in diameter at and adjacent its inlet end, as shown at 22, and flares outwardly at and adjacent its outlet end, as shown at 23. Since the bore 25 in plug 12 is conical or flared at its inlet end, the effect of the plug and the sleeve is to provide a Venturi throat. Confined between the annular flanges 27 and 28 of the sleeve there is a relatively rigid annular insert 30 which has a peripheral recess providing an annular chamber 32 exposed to the inner surface of the casing. This chamber communicates with the periphery of the sleeve 20 around the throat 22 through radial ports 35 in the insert.

A boss 40 is formed integral with the casing, the boss having a bore 42 providing a cylinder for a piston 44 having an externally threaded actuating rod 45 provided at its outer end with transverse holes 46 to receive a turning tool not shown. The threads of the rod 45 engage with threads 47 in the bore. The bottom end of the bore 42 is closed by a threaded plug 48 having an opening 49 to threadedly receive a valve-controlled grease nozzle 50. Cylinder 42 communicates with the chamber 32 through a port 52.

For the purpose of providing a visual gauge to indicate the extent of opening or closing of throat 22, I provide a circumferential line 55 along the top end of the rod 45 and provide a scale 56 of calibrations on the periphery of the casing contiguous to the outer end of the piston rod, so that as the rod is screwed inwardly and outwardly of the cylinder the scale will indicate the extent of constriction or expansion of the throat.

To calibrate the device, a grease gun is applied to the nozzle 50 and the piston rod is screwed down until the piston is in its innermost position in the cylinder or until the line 55 is opposite zero reading on the scale (Figs. 1 and 3). Then hydraulic fluid F is forced from the gun into the cylinder and chamber and between the insert and sleeve until the throat 22 is fully closed. Then the piston rod is screwed outwardly until the desired flow conditions are obtained, which point will be indicated by the position of the line 55 with relation to the scale 56.

Figure 4:
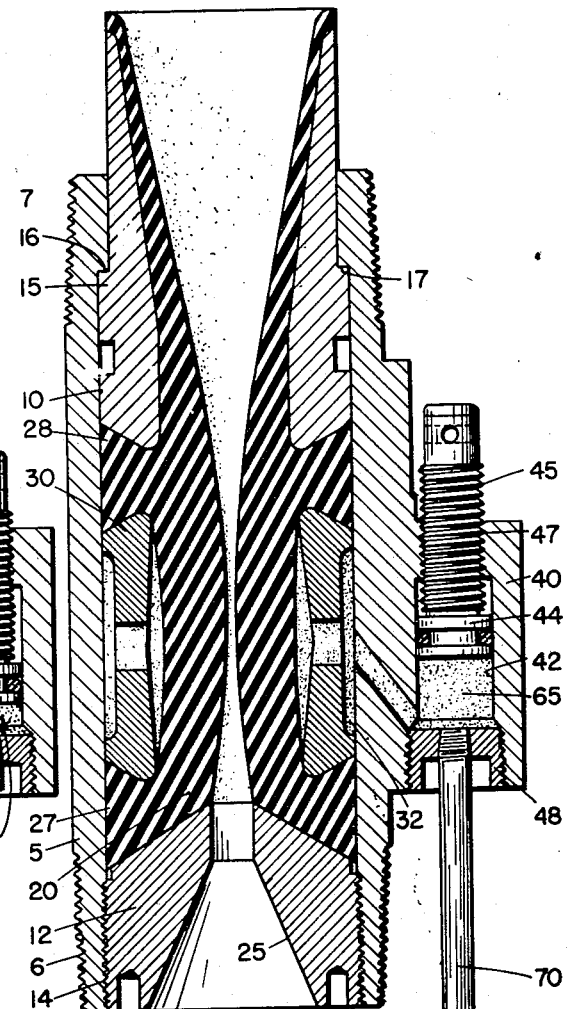
Fig. 4 is a view of another embodiment of my invention including associated means for automatically controlling the flow.

In Fig. 4 I show another embodiment of my invention which is capable of automatically effecting changes in the size of the flow orifice in response to changes in well pressure.

Here the casing and its carried parts are the same as before described and are given like reference numerals, except that the piston for forcing the hydraulic fluid against the periphery of the rubber sleeve is not used and the rubber sleeve is automatically actuated by gas pressure instead of the threaded piston rod before described.

Here the grease nozzle before described is removed and a conduit 70, leading from a scrubber 72 through pressure regulating valve 73, communicates with the pressure chamber 65. The scrubber is, of course, in communication with the well gas pressure through a line 66 leading from the conventional "Christmas tree." For regulating and setting the device I utilize the piston 44 and its threaded rod 45 to vary the size of chamber 65. As is well known, a scrubber such as here described is a device for separating the oil from the gas.

Thus a regulated amount of gas pressure is caused to act upon the rubber sleeve and due to the resilient nature of the gas, a reduction of the well pressure will allow the counteracting gas pressure surrounding the rubber sleeve to expand and reduce the orifice opening and vice versa—with the regulator, the gas pressure can be suitably proportioned to maintain the desired well pressure.

Figure 5:
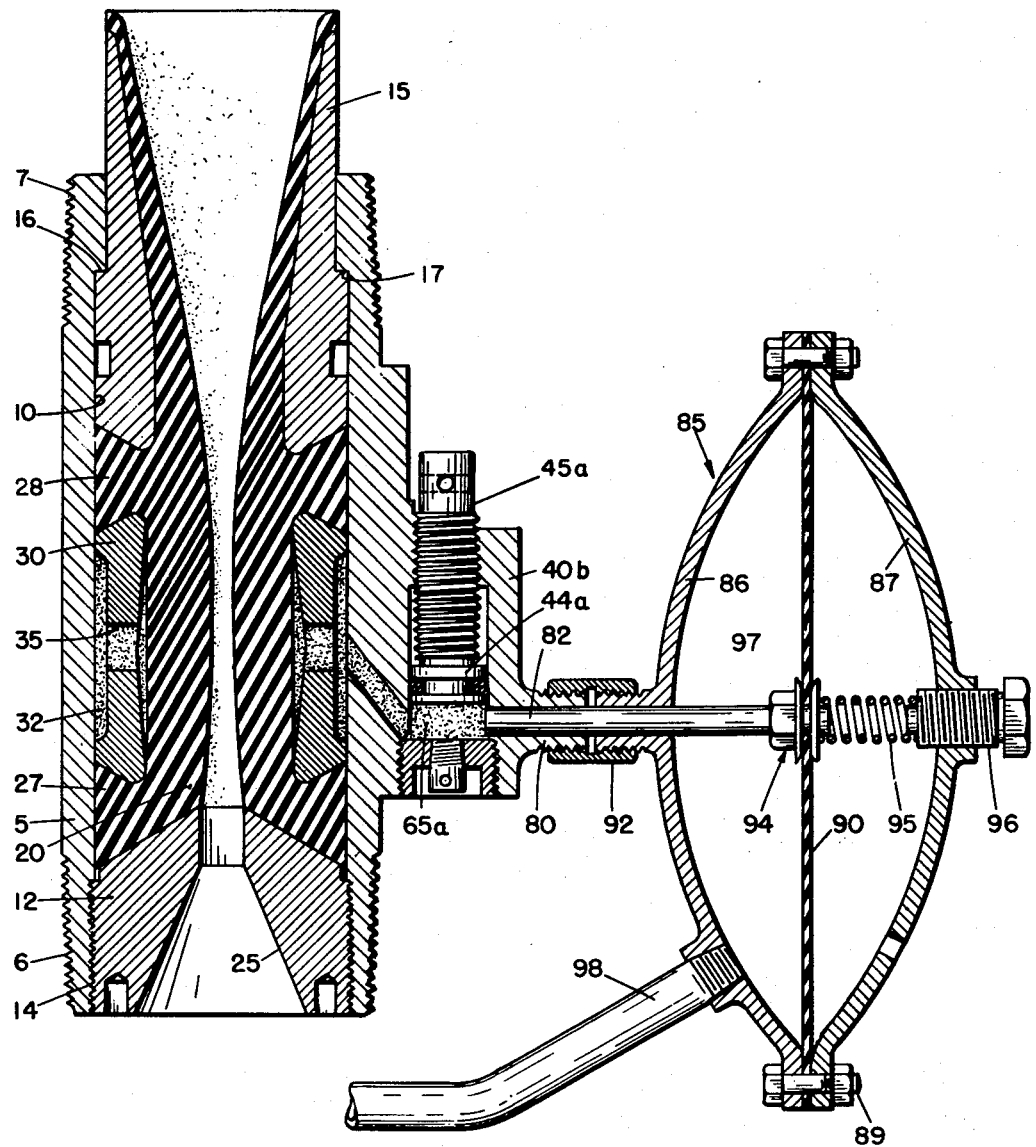
Fig. 5 is a medial sectional view showing a further embodiment of my invention and showing another associated means of effecting automatic control.

In the form of device shown in Fig. 5, the full amount of the well pressure is utilized in reverse manner as compared with the manner in which it is utilized in the device of Fig. 4 to actuate the hydraulic fluid, so that increased well pressure acts to increase the size of the orifice.

Here again the casing 5 and its carried inner parts are as shown in Figs. 1-3 and are given like numerals, except that the boss 40b has a cylindrical extension 80 within the bore of which is reciprocally mounted a plunger 82, the plunger being adapted during reciprocation to move into the cylinder below the piston 44a. Here the piston 44a and its actuating rod 45a are merely for the purpose of setting the device in relation to a given amount of hydraulic fluid in the system. A diaphragm casing generally denoted 85 is composed of two concaved plates 86, 87 secured together along their marginal portions by bolts 89. This casing houses a diaphragm 90, the edge of the diaphragm being confined between the marginal portions of the plates. Plate 86 has a tubular neck registering with and secured to the boss extension 80 by means of a threaded collar 92, the plunger 82 extending through the bore of the neck.

The inner end of the plunger 82 is secured to the central portion of the diaphragm by the nut and washer assembly 94. A compression spring 95 bears at one end against the right-hand end of the plunger 82 and bears at its other end against a screw plug 96 threadedly mounted in plate 87. The tension of the spring may be adjusted by the plug 96 to regulate and maintain the desired well pressure.

The plate 86 and the contiguous surface of the diaphragm define a pressure chamber 97 which is exposed to the well pressure through a conduit 98 communicating with the well through the conventional "Christmas tree" unit.

Thus it will be observed that as the well pressure rises, the plunger 82 is moved outwardly of chamber 47a, thus reducing the pressure on the hydraulic fluid and thus also reducing the constricting pressure about the throat 22, allowing the sleeve to expand and open the throat. Conversely, decrease in well pressure allows the spring 95 to move the plunger inwardly of the chamber to increase the pressure on the hydraulic fluid and to consequently constrict the throat 22.

The difference between Figs. 4 and 5 is that the device of Fig. 4 is only semi-automatic as only the resilience of the gas pressure is being used and only pressures equal to or less than the well pressure can be caused to act against the rubber sleeve.

The device of Fig. 5 acts directly from the well pressure fluctuations and is fully automatic. Also through the spring 95 pressures greater than the well pressure can be caused to act against the rubber sleeve.

I claim:

A flow bean for an oil well comprising a casing having a longitudinal bore adapted for connection at its inlet end to a well, a flexible sleeve mounted axially in the casing and defining a fluid passageway therethrough, and means for varying the cross-sectional area of the passageway in response to fluid pressure in the well, comprising a cylinder adapted to contain hydraulic fluid, a plunger mounted to reciprocate in the cylinder, a diaphragm housing, a diaphragm in the housing and defining therewith a fluid chamber, means operatively connecting the diaphragm to the plunger, spring means normally urging the plunger in one direction in relation to the cylinder, conduit means for exposing the chamber to fluid pressure in the well to move the plunger in the opposite direction against the pressure of said spring, and piston means threaded into the cylinder, said piston means being operable in response to rotary movement thereof to vary the capacity of the cylinder.

CLINTON A. LANGSTAFF.

REFERENCES CITED

The following references are of record in the file of this patent:

UNITED STATES PATENTS

| Number | Name | Date |
| --- | --- | --- |
| 210,521 | Walter | Aug. 28, 1923 |
| 1,873,138 | Mitchell | Aug. 23, 1932 |
| 2,066,544 | Shaw | Jan. 5, 1937 |
| 2,163,007 | O'Dell | June 20, 1939 |
| 2,241,086 | Gould | May 6, 1941 |
| 2,409,768 | Lavett | Oct. 22, 1946 |
| 2,446,620 | Swollow | Aug. 10, 1948 |
| 2,467,150 | Nordell | Apr. 12, 1949 |
| 2,470,744 | Korn | May 17, 1949 |